3,230,268
PREPARATION OF CHLORO-SUBSTITUTED
BENZENE DERIVATIVES
Kanjiro Kobayashi, Nishinomiya, and Norio Ishino,
Ibaraki, Japan, assignors to Fuso Chemical Co., Ltd.,
Osaka, Japan
No Drawing. Filed Apr. 9, 1962, Ser. No. 185,832
13 Claims. (Cl. 260—651)

The present invention relates to novel methods for the preparation of chloro-substituted benzene derivatives, and more particularly those chloro-substituted benzene derivatives having the following general formula:

(I)
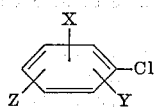

wherein X is H or Cl, Y is H, —CCl$_3$, —COOH or —COCl, and Z is H or a group same as Y and is in m- or p-position in respect of the group Y. The compounds of the Formula I are known and are valuable as chemical intermediates.

It is known to prepare chloro-substituted trichloromethylbenzene by chlorinating, for example, toluenesulfochloride at such a high temperature as 150–200° C. (C., 1898, II, 800; Beil., H5, 300, 303; D.R.P. 98,433). Since this method requires a high temperature it is accompanied by undesired chlorinolysis which causes darkening and resinification of the product and results in a poor yield and low purity of the product.

It is also known to effect the chlorination of sodium p-toluenesulfonate or p-toluenesulfochloride with thionylchloride at a high temperature of 230–260° C. under pressure (Beil., EI11, 24, 26; C. 1915, I, 464; D.R.P. 282,133; M. 36, 730). In any case, it is required to employ unduly high temperatures or pressure and therefore these methods are not economical and are industrially impracticable.

In view of these difficulties, it has been conventional to prepare, for example, chloro-substituted trichloromethylbenzenes by reacting toluenes substituted with chlorine atom at a desired position with chlorine gas at a temperature of 80–165° C. in the presence of a catalyst such as phosphorus trichloride resulting in the selective trichlorination only of the methyl radical on the benzene ring (P.B. 77,764 (No. 33); 25,602; 17,658). This method is satisfactory to some extent, but its drawback is that it requires the starting materials, e.g. o- or p-chloro substituted toluene or xylene, of high purity which are expensive.

Therefore it is a general object of this invention to provide a novel method for producing trichloromethyl- or bistrichloromethylbenzenes substituted with chlorine, which method can be carried out easily, cheaply (with less expensive starting materials) and with excellent yield and purity of the objective compounds.

It is a more particular object of this invention to provide a novel method for producing trichloromethyl- or bis-trichloromethylbenzenes substituted with chlorine, which enables the use, as the starting materials, of chloro-substituted or non-substituted toluene- or xylene-sulfochlorides which are less expensive than conventional toluenes or xylenes substituted with chlorine at o- or p-position.

Another object of this invention is to provide a novel method as mentioned above and which can be carried out at a relatively low temperature without accompanying undesired chlorinolysis and without chlorination of any of the hydrogens directly attached to the ring carbons, so that the objective compounds are obtained in excellent yield and purity.

It is still another object of this invention to provide an economical method for producing derivatives (such as acid chlorides, carboxylic acids) of the above mentioned trichloromethyl- or bistrichloromethylbenzenes substituted with chlorine.

Other objects, features and advantages of the invention will be clear from the following detailed description.

We have found that when a toluene- (or xylene-) sulfochloride or chloro-substituted toluene- (or xylene-) sulfochloride is reacted with chlorine in an inert polychlorinated aliphatic or aromatic hydrocarbon under the irradiation of ultra-violet ray or/and in the presence of a free-radical generator-type catalyst, there occurs trichlorination of the methyl radical(s) on the benzene ring and also chlorine exchange reaction on the sulfochloride radical at a low temperature (60–90° C.) without undesired chlorinolysis and without chlorination on the benzene ring except the exchange of the sulfochloride radical with a chlorine atom.

The general reaction of this invention may be formulated as follows:

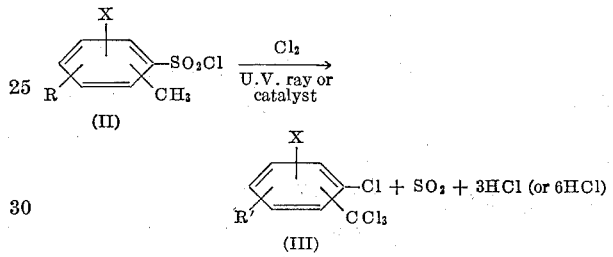

wherein X is H or Cl, and R in the Formula II is in the para- or meta-position in respect of the methyl radical and represents H or —CH$_3$, and R' in the Formula III is in the para- or meta-position in respect of the trichloromethyl radical and represents H or —CCl$_3$.

The starting materials, chloro-substituted or non-substituted toluene- or xylene-sulfochlorides of the Formula II used in the process of this invention are less expensive than toluenes or xylenes substituted with chlorine atom at the ortho- or para-position which have conventionally been employed as the starting materials for the preparation of the compounds of the same type as obtained by our invention. It is preferable in carrying out the method of this invention to use o- or p-toluenesulfochloride, 3-chloro-4-methylbenzenesulfochloride and p- or m-xylenesulfochloride among those represented by the above Formula II.

A polychlorinated aliphatic or aromatic hydrocarbon which is inert to the chlorination is used as reaction medium in this invention. Examples of these hydrocarbons are chloroform, carbontetrachloride, dichlorobenzene, trichlorobenzene, chloro-substituted trichloromethyl- or bistrichloromethylbenzenes. When derivatives of the compounds of the Formula III, such as acid chlorides of the hereinafter indicated Formula IV and carboxylic acids of the hereinafter given Formula V are to be produced as hereinafter detailed, it is particularly preferable to employ a chloro-substituted trichloromethyl- or bistrichloromethylbenzene which is identical with the objective product. The amount of the reaction medium or solvent is not critical, but it is preferable to employ the medium in an amount of 1–10 parts by volume per part of the starting material.

The chlorination of the present invention is carried out on the basis of the so-called radical chain reaction and is characterized by being conducted under the irradiation of ultra-violet ray or/and in the presence of a free-radical generator-type catalyst. Examples of the free-radical generator-type catalysts useful in our process are azobis-compounds such as azobisisobutyronitrile, azobisisovaleronitrile, etc., organic peroxides, preferably acyl peroxides such as lauroyl peroxide, benzoyl peroxide, 4-chlorobenzoyl peroxide, 2,4-dichlorobenzoyl peroxide, etc. A mixture of two or more of these catalysts may also be used. Generally, azobis-compounds are particularly useful in accelerating the chlorination at the initial stage and organic peroxides are particularly effective in retarding the reaction. Therefore, when the process is carried out on a large scale, it is recommended to employ a mixture of the azobis-compounds and organic peroxides. The amount of the catalyst may vary widely depending upon the conditions of the reaction, but a satisfactory result is obtained if the catalyst is used in an amount of 0.5–3 mole percent based upon the starting compound (Formula II).

In carrying out the method of this invention the starting material or the sulfochloride of the Formula II is dissolved in a reaction medium or solvent, and chlorine gas is introduced into the solution while subjecting the latter to irradiation of ultra-violet light. Preferably the source of the ultra-violet light is placed as close to the reaction vessel as possible. Alternatively, chlorine gas is introduced into a reaction mixture consisting of the starting material, catalyst and reaction medium.

In any case, chlorine gas is introduced into the solution while maintaining the latter at a temperature of from 60° C. to 90° C., preferably from 60° C. to 80° C. Initially, chlorine gas is introduced slowly until saturation. Within a few minutes after the saturation the reaction is initiated with violent generation of sulfur dioxide and hydrogen chloride. Once the reaction is started the rate of chlorine gas introduction is increased and controlled to avoid escape of an excess chlorine from a gas outlet of the reaction vessel.

Generally, in about 3–5 hours chlorine gas is absorbed in an amount of about 70–80% of the theoretical amount (calculated as 3 moles of chlorine per one methyl radical and 1 mole per one —SO$_2$Cl radical contained in the starting compound), and then the reaction speed gradually decreases, while the rate of chlorine gas introduction is decreased corresponding to the absorption rate and the reaction is further continued. After a total time of about 20–30 hours the reaction is completed. The total amount of chlorine including some excess which may escape from the reaction vessel is usually up to about 90% of the theoretical amount.

The process should be carried out in as dry state as possible and therefore care should be taken to use the reactants and reaction medium in anhydrous state.

After the completion of the reaction, the resulting mixture may be subjected to distillation to recover the solvent and purify the objective compound of the Formula III. As the catalyst has been decomposed at the end of the reaction no danger is encountered in the distillation.

The method of the present invention has various advantages. For example, the starting material of the Formula II is less expensive. The reaction can be effected smoothly under mild conditions, particularly at a low temperature so that side reactions such as chlorinolysis, undesired chlorination of the benzene ring, etc. do not occur, and accordingly the objective compound is obtained in an excellent yield (for example, as high as about 96% or higher) and purity. Chlorine atom liberated from the sulfochloride radical contained in the starting material contributes to the chlorinating reaction so that the amount of chlorine gas to be introduced may be smaller than that theoretically required.

The further remarkable advantage of this invention is that, since the solution resulting from the aforementioned chlorination is substantially free from any undesired by-product it can directly be subjected to hydrolysis to obtain derivatives (such as acid chlorides, esters and carboxylic acids) of the compounds of the Formula III. As explained hereinbefore, when such derivative is to be produced, it is preferable to employ, as the reaction medium, the compound of the Formula III which is identical with the objective compound, from which the derivative is to be produced.

The hydrolysis may be carried out in a conventional manner. Thus, for example, when acid chlorides are desired the solution resulting from the chlorinating reaction is subjected to partial hydrolysis with a theoretical amount of water in the presence of a dehydrochlorinating catalyst such as FeCl$_3$, ZnCl$_2$, etc. in a conventional manner. This hydrolysis may be formulated as follows:

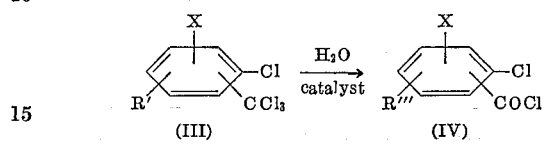

wherein X and R' are as defined before, and R''' in the Formula IV is in m- or p-position in respect of —COCl and represents H or —COCl.

If carboxylic acids are desired the solution resulting from the chlorinating reaction is subjected to hydrolysis in an acidic or alkaline condition in a conventional manner, as follows:

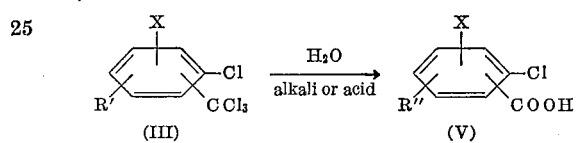

wherein X and R' are as defined before, and R'' in the Formula V is in p- or m-position in respect of —COOH and designates H or —COOH.

The corresponding esters may be obtained by subjecting the solution resulting from the chlorinating reaction to alcoholysis in a conventional manner.

In any case, acid chlorides, carboxylic acids and esters are obtained easily and in an excellent yield.

*Example 1*

A 300 ml. quartz flask provided with a gas inlet tube, outlet tube and a thermometer was charged with 19.1 g. of freshly distilled p-toluenesulfochloride and 190 ml. of carbon tetrachloride. While irradiating with a 100 watt ultraviolet lamp placed at a distance of three inches from the flask surface, chlorine gas was slowly introduced into the solution maintained at a temperature of 70±1° C. until saturation, and after about 10 minutes a yellow color of chlorine disappeared with violent generation of hydrogen chloride and sulfur dioxide which indicated the commencement of the reaction. Once the reaction was started the rate of introduction of chlorine gas was increased and controlled to avoid escape of an excess chlorine gas from the gas outlet. After about 5 hours the reaction velocity gradually decreased and the rate of introduction of chlorine gas was decreased correspondingly. The reaction was continued for a total of 32 hours. After recovering carbon tetrachloride, the resulting light yellow transparent solution was subjected to vacuum distillation to obtain 21.75 g. (yield 94.5%) of p-chlorobenzotrichloride, B.P. 125–135° C./20 mm., d.=1.495 (15° C.), which upon hydrolysis gave an almost theoretical amount of p-chlorobenzoic acid but not p-chlorobenzaldehyde.

*Example 2*

To a mixture of 95.3 g. of freshly distilled p-toluenesulfochloride, 0.8 g. of azobis-isobutyronitrile and 980 ml. of carbon tetrachloride, maintained at a temperature between 68° C. and 72° C., was introduced chlorine gas to effect the chlorination as in Example 1 for 30 hours. After the reaction the resulting light yellow solution was subjected to distillation under vacuum to obtain 105.3 g. (yield 91.5%) of substantially colorless transparent p-chlorobenzotrichloride, B.P. 125–135° C./20 mm., d.=1.496 (15° C.).

Example 3

The procedure of Example 2 was repeated except that chloroform was used instead of carbon tetrachloride and the chlorination reaction was conducted at 60° C. The resulting solution, after evaporation of chloroform, was subjected to vacuum distillation to obtain 103.5 g. (yield 90%) of substantially colorless transparent p-chlorobenzotrichloride, B.P. 125–135° C./20 mm.

Example 4

To a mixture of 323 g. of freshly distilled p-toluenesulfochloride, 4.1 g. of benzoyl peroxide and 1600 ml. of carbon tetrachloride, maintained at a temperature between 67° C. and 71° C., was introduced chlorine gas as in Example 1 to effect chlorination for 32 hours. During the reaction 450 g. of chlorine was introduced. The resulting solution was subjected to distillation to obtain 376 g. (yield 96.4%) of substantially colorless p-chlorobenzotrichloride, B.P. 125–135° C./20 mm.

Example 5

To a mixture of 95.3 g. of freshly distilled o-toluenesulfochloride, 2 g. of lauroyl peroxide and 980 ml. of carbon tetrachloride, maintained at a temperature between 68° C. and 71° C., chlorine gas was introduced as in Example 1 to effect chlorination for 32 hours. Upon distillation of the resulting solution there were obtained 103.2 g. (yield 89.7%) of substantially colorless transparent o-chlorobenzotrichloride, B.P. 130–140° C./20 mm.

Example 6

To a mixture of 112.5 g. of freshly distilled 3-chloro-4-methylbenzenesulfochloride, 1.5 g. of benzoyl peroxide and 562 ml. of carbon tetrachloride, maintained at a temperature of 70±1° C., was introduced chlorine gas as in Example 1 to effect chlorination for 30⅓ hours. Upon distillation of the resulting light yellow solution, there were obtained 105.1 g. (yield 79.4%) of substantially colorless and transparent 2,4-dichlorobenzotrichloride, B.P. 150–160° C./20 mm.

Example 7

To a mixture of 102.3 g. of m-xylene-4-sulfochloride (B.P. 158–159° C./16 mm.), 1.2 g. of benzoyl peroxide, 0.8 g. of azobisisobutyronitrile and 510 ml. of carbon tetrachloride, maintained at a temperature between 68° C. and 70° C., was introduced chlorine gas as in Example 1 to effect chlorination for 30½ hours. The resulting solution, after recovering carbon tetrachloride, was subjected to distillation under vacuum to obtain 140 g. (yield 80.6%) of 4-chloro-1,3-bis-trichloromethylbenzene which was a slightly yellow, transparent viscous liquid (B.P. 163–168° C./8.5 mm., d.=1.623 at 15° C.). The product, upon hydrolysis, gave 4-chloro-isophthalic acid in an excellent yield.

Example 8

The procedure of Example 7 was repeated except that p-xylene-sulfochloride was used in place of m-xylene-4-sulfochloride. The resulting solution was distilled to obtain 136 g. (yield 78.3%) of slightly yellow, transparent 2-chloro-1,4-bis-trichloromethylbenzene (B.P. 162–168° C./8.5 mm.), which upon hydrolysis gave monochloro-terephthalic acid in an excellent yield.

Example 9

To a mixture of 5 kg. of crude p-toluenesulfochloride (dried), 7.5 kg. of p-chlorobenzotrichloride, 0.021 kg. of azobisisobutyronitrile and 0.063 kg. of benzoyl peroxide, maintained at a temperature of about 70° C., was continuously introduced chlorine gas. After about 5 hours the rate of absorption of chlorine decreased, so that the temperature of the reaction mixture was raised up to about 80° C. and the chlorination was continued. The reaction was completed after a total time of 23 hours. Then dry air was blown into the resulting solution at about 80° C. to drive off hydrogen chloride and any excess chlorine, and there were obtained 13.64 kg. (d.=1.498 at 15° C.) of crude p-chlorobenzotrichloride which was light yellow and transparent. Upon distillation, the crude product gave a purified fraction (B.P. 125–135° C./20 mm.) in an amount which corresponded to 95% of the crude product and to a yield of about 90–91% based on the theoretical amount.

A mixture of 10 kg. of the above crude p-chlorobenzotrichloride, 50 kg. of water and 0.06 kg. of a cationic surfactant was stirred for 20 hours at a temperature between 90 and 92° C. to be hydrolyzed. After cooling, the crystals formed were separated, washed with water and dissolved in an aqueous sodium hydroxide solution. The solution was treated with activated carbon and acidified with sulfuric acid to precipitate the hydrolyzed product. Thus, 6.14 kg. of colorless crystalline p-chlorobenzoic acid (M.P. 234.5–237.5° C.) was obtained (yield 86.5% calculated on the crude p-toluenesulfochloride).

Example 10

To a mixture of 75.9 kg. of the crude p-chlorobenzotrichloride obtained as in Example 9 and 0.068 kg. of anhydrous ferric chloride, maintained at a temperature of 90–94° C., was dropwisely added, under stirring, 5.387 kg. of water for 20 hours to effect a partial hydrolysis. Then dry air was blown into the resulting liquid at a temperature of 90–94° C. for 30 minutes, and the liquid was distilled under vacuum to obtain 48.83 kg. (yield 83.04%, calculated on the crude p-toluenesulfochloride employed) of colorless p-chlorobenzoyl chloride, B.P. 135–137.5° C./50 mm.

What we claim is:

1. A method for preparing a chloro-substituted benzene derivative of the formula

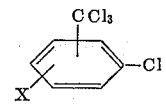

wherein X represents a member selected from the group consisting of H, Cl and CCl₃, said Cl and CCl₃ group being in one of the positions meta and para to the CCl₃ group, which comprises reacting a compound of the formula

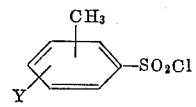

wherein Y represents a member selected from the group consisting of H, Cl and CH₃, said Cl and CH₃ group being in one of the positions meta and para to the CH₃ group, with chlorine at a temperature of from 60° to 90° C. in an inert medium under irradiation with ultraviolet rays.

2. A method for preparing a chloro-substituted benzene derivative of the formula

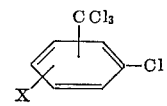

wherein X represents a member selected from the group consisting of H, Cl and CCl₃, said Cl and CCl₃ group being in one of the positions meta and para to the CCl₃ group, which comprises reacting a compound of the formula

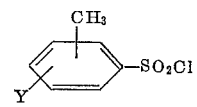

wherein Y represents a member selected from the group consisting of H, Cl and CH₃, said Cl and CH₃ group being in one of the positions meta and para to the CH₃ group, with chlorine at a temperature of from 60° to 90° C. in an inert medium containing a free-radical generator catalyst.

3. A method for preparing a chloro-substituted benzene derivative of the formula

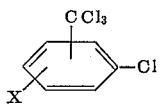

wherein X represents a member selected from the group consisting of H, Cl and $CCl_3$, said Cl and $CCl_3$ group being in one of the positions meta and para to the $CCl_3$ group, which comprises reacting a compound of the formula

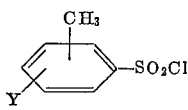

wherein Y represents a member selected from the group consisting of H, Cl and $CH_3$, said Cl and $CH_3$ group being in one of the positions meta and para to the $CH_3$ group, with chlorine at a temperature of from 60° to 90° C. in an inert medium, said inert medium containing a free-radical generator catalyst selected from the group consisting of azobiscompounds and organic peroxides.

4. A method for preparing a chloro-substituted benzene derivative of the formula

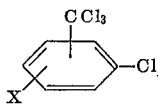

wherein X represents a member selected from the group consisting of H, Cl and $CCl_3$, said Cl and $CCl_3$ group being in one of the positions meta and para to the $CCl_3$ group, which comprises reacting a compound of the formula

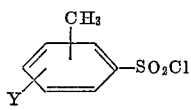

wherein Y represents a member selected from the group consisting of H, Cl and $CH_3$, said Cl and $CH_3$ group being in one of the positions meta and para to the $CH_3$ group, with chlorine at a temperature of from 60° to 90° C. in an inert medium, said inert medium containing a mixture of free-radical generator catalysts selected from the group consisting of azobis-compounds and organic peroxides.

5. A method as in claim 2 wherein the free-radical generator catalyst is azobisisobutyronitrile.

6. A method as in claim 2 wherein the free-radical generator catalyst is azobisisovaleronitrile.

7. A method as in claim 2 wherein the free-radical generator catalyst is lauroyl peroxide.

8. A method as in claim 2 wherein the free-radical generator catalyst is benzoyl peroxide.

9. A method as in claim 2 wherein the free-radical generator catalyst is 4-chlorobenzoyl peroxide.

10. A method as in claim 2 wherein the free-radical generator catalyst is 2,4-dichlorobenzoyl peroxide.

11. A method as in claim 4 wherein the medium contains a mixture of benzoyl peroxide and azobisisobutyronitrile as free-radical generator catalyst.

12. A method as in claim 1 wherein the inert medium is a member selected from the group consisting of polychlorinated aliphatic and polychlorinated aromatic hydrocarbons.

13. A method as in claim 2 wherein the inert medium is a member selected from the group consisting of polychlorinated aliphatic and polychlorinated aromatic hydrocarbons.

References Cited by the Examiner

FOREIGN PATENTS 98,433 12/1896 Germany.
133,000 7/1902 Germany.
747,994 10/1944 Germany.

OTHER REFERENCES

Davies et al.: Chem. Zantralblatt, 1953, p. 3243.
Kharasch et al.: J. Org. Chem., vol. 6, 1941, pp. 810–817.
Kroepelin et al.: Ang. Chemie, vol. 64, 1952, pp. 273–274.

LEON ZITVER, *Primary Examiner.*

B. M. EISEN, K. H. JOHNSON, K. V. ROCKEY,
*Assistant Examiners.*